United States Patent [19]

Crass et al.

[11] Patent Number: 4,595,625
[45] Date of Patent: Jun. 17, 1986

[54] SEALABLE MULTILAYER FILM FOR PACKAGING PURPOSES

[75] Inventors: Günther Crass, Taunusstein; Lothar Bothe, Mainz; Siegfried Janocha, Wiesbaden; Wolfgang Dietz, Saarbruecken, all of Fed. Rep. of Germany

[73] Assignee: Hoechst Aktiengesellschaft, Frankfurt am Main, Fed. Rep. of Germany

[21] Appl. No.: 645,625

[22] Filed: Aug. 30, 1984

[30] Foreign Application Priority Data

Sep. 5, 1983 [DE] Fed. Rep. of Germany ....... 3331983
Jan. 31, 1984 [DE] Fed. Rep. of Germany ....... 3403153

[51] Int. Cl.$^4$ .................. B32B 27/08; B32B 27/32; B65B 11/00
[52] U.S. Cl. .................................... 428/215; 428/331; 428/349; 428/447; 428/910; 428/516; 428/451; 427/39; 229/87 R; 264/176 R; 53/203
[58] Field of Search ............... 428/331, 349, 447, 451, 428/910, 215, 516; 53/203

[56] References Cited

U.S. PATENT DOCUMENTS

| | | | |
|---|---|---|---|
| 4,230,767 | 10/1980 | Isaka et al. | 428/349 |
| 4,293,608 | 10/1981 | Isaka et al. | 428/349 |
| 4,294,882 | 10/1981 | Andrews et al. | 428/349 |
| 4,348,457 | 9/1982 | Rosenthal et al. | 428/349 |

FOREIGN PATENT DOCUMENTS

| | | |
|---|---|---|
| 1377114 | 9/1964 | France . |
| 1145199 | 6/1967 | United Kingdom . |
| 1582186 | 12/1980 | United Kingdom . |

OTHER PUBLICATIONS

Ullmanns Encyklopaedie der Technischen Chemie, vol. 12, "Natural Resins", pp. 525–528, Synthetic Resins pp. 539–555.

*Primary Examiner*—P. C. Ives
*Attorney, Agent, or Firm*—Schwartz, Jeffery, Schwaab, Mack, Blumenthal & Evans

[57] ABSTRACT

Disclosed is a sealable transparent multilayer film, comprising: a base layer comprised of a propylene polymer and at least one sealable layer comprised of a combination of:

(a) from about 67.5 to 89.6% by weight, relative to the weight of the sealable layer, of an olefin resin composition comprised of a co- or terpolymer of ethylene, propylene, butylene or another alpha-olefin having 5 to 10 carbon atoms or of a mixture of said polymers, (b) from about 5 to 15% by weight, relative to the weight of the sealable layer, of a low molecular weight resin which is compatible with the olefin resin composition, (c) from about 5 to 15% by weight, relative to the weight of the sealable layer, of a propylene homopolymer, (d) from about 0.3 to 1.5% by weight, relative to the weight of the sealable layer, of a polydiorganosiloxane, and (e) from about 0.1 to 1.0% by weight, relative to the weight of the sealable layer, of a silicate having the shape of platelets. Also disclosed is a process for the high-speed wrapping of articles utilizing the film according to the invention.

12 Claims, No Drawings

SEALABLE MULTILAYER FILM FOR PACKAGING PURPOSES

BACKGROUND OF THE INVENTION

The present invention relates to a sealable transparent multilayer film comprising a base layer formed of a propylene polymer and at least one sealable layer.

German Offenlegungsschrift No. 16 94 694 (equivalent to British Pat. No. 1,145,199) discloses heat-sealable laminates which comprise an oriented polypropylene film having at least one heat-sealable layer formed of an ethylene-propylene copolymer comprising from 2 to 6% by weight of ethylene and from 98 to 94% by weight of propylene. These films exhibit good heat-sealability; however, their scratch-resistance and clearness are not of the desired degree, and, in addition, their processing characteristics in high-speed packaging machines are insufficient.

European Pat. No. 27 586 (equivalent to U.S. Pat. No. 4,348,457) describes sealable polypropylene films, which possess a sealing layer comprising an ethylene bromo- or copolymer and contain a long-chain aliphatic amine, an incompatible thermoplastic component and a polydialkyl siloxane. Although these films are improved over those of British Pat. No. 1,145,199, their reliability of running in horizontal forming, filling and sealing machines is still insufficient.

German Offenlegungsschrift No. 29 41 140 (equivalent to U.S. Pat. No. 4,293,608) discloses a packaging material which comprises a base layer of a polypropylene polymer and a surface layer formed of a blend of a propylene-ethylene copolymer and a $C_4$ to $C_{10}$ alpha-olefin-propylene copolymer. This surface layer may also contain a low-molecular weight thermoplastic resin and silicone oils. Packaging materials of this kind have the disadvantage that they are sensitive to scratching and still have insufficient optical properties.

There has also been proposed a film which possesses sealing layers of specifically composed polyolefinic copolymers or terpolymers. Due to being modified with a propylene homopolymer, a dimethyl polysiloxane and a synthetic resin, this film exhibits good processing properties on high-speed packaging machines, an improved visual appearance and a high scratch resistance. These films fulfill the requirements to be met by a packaging film from the point of view of machine engineering, but handling of the film is rather problematic because of its extremely smooth surfaces which have a very low coefficient of friction. For example, when the film roll having the original full width (about 4 m to 6 m) is cut into rolls of smaller widths, an increased lateral deviation of the cutting edges results, i.e., it is not possible to obtain rolls having exactly the desired width. Instead, this width is exceeded to a greater or lesser amount due to the fact that the film escapes laterally when high cutting speeds are employed. In the description which follows, the steps of slitting and winding-up shall be referred to as "converting".

Yet another disadvantage of the above film resides in its high tendency to telescope on the roll during handling, which may already occur on the slitter or when the film roll is inserted into the packaging machine. Telescoping means a lateral displacement of the film on the roll, in which the surfaces of adjacent layers all slide to one side, as a result of which the edges of the film are no longer positioned exactly above one another. Instead, each layer is displaced in one direction by a small amount, and therefore the whole roll protrudes from one side of the mandrel. Telescoping usually occurs when the rolls are bumped against something or when they are held in a slightly inclined position.

Due to these difficulties, the machine speed must be reduced down to about half the normal speed during converting, and any further handling of the rolls must be done very carefully.

SUMMARY OF THE INVENTION

It is therefore an object of the present invention to provide a sealable transparent olefinic multilayer film which can be readily processed on high-speed packaging machines, which can be easily converted.

Another object of the invention resides in providing such a multilayer film which does not have any tendency to telescope.

It is also an object of the invention to provide such a multilayer film which nevertheless meets the stringent requirements concerning optical properties and scratch resistance.

Still another object of the invention is to provide an improved method of high speed packaging and final packaged articles utilizing the film according to the present invention.

In accomplishing the foregoing objects, there has been provided in accordance with one aspect of the present invention a sealable, biaxially oriented multilayer film which comprises a polypropylene base layer and a sealing layer, comprised of:

(a) from about 67.5 to 89.6% by weight, relative to the weight of the sealable layer, of an olefin resin composition composed of a co- or terpolymer of ethylene, propylene, butylene or another alpha-olefin having 5 to 10 carbon atoms or of mixtures thereof, (b) from about 5 to 15% by weight, relative to the weight of the sealable layer, of a low molecular weight resin which is compatible with the olefin resin composition, (c) from about 5 to 15% by weight, relative to the weight of the sealable layer, of a propylene homopolymer, (d) from about 0.3 to 1.5% by weight, relative to the weight of the sealable layer, of a polydiorganosiloxane or siloxane derivative, and (e) from about 0.1 to 1.0% by weight, relative to the weight of the sealable layer, of an inorganic pigment comprising a silicate having the shape of platelets.

In accordance with another aspect of the present invention, there has been provided a high-speed process for wrapping articles with a packaging film, comprising the steps of: feeding to a high-speed packaging machine a multilayer packaging film as defined above; introducing an article to be wrapped into the machine; and packaging the article with the film at a high speed in the machine.

There has also been provided in accordance with the invention a packaged article, comprising an article wrapped with a multilayer packaging film, wherein the film comprises the film, defined above.

Further objects, features and advantages of the invention will become apparent from the detailed description of preferred embodiments which follows.

DETAILED DESCRIPTION OF PREFERRED EMBODIMENTS

The base layer of the sealable polyolefinic multilayer film is formed of a propylene polymer which is, for the major part, comprised of propylene and has a melting point of about 140° C. or higher, preferably of about 150° C. or higher.

Specific examples of the propylene polymer forming the base layer include isotactic polypropylene, having an n-heptane-soluble constitute of about 15% by weight or less, copolymers of ethylene and propylene, having an ethylene content of about 10% by weight or less, copolymers of polypropylene with $C_4$ to $C_8$ alpha-olefins, having a content of $C_4$ to $C_8$ alpha-olefins of about 10% by weight or less.

The propylene polymer of the base layer appropriately has a melt flow index of from about 0.5 g/10 min to 8 g/10 min, in particular of from about 1.5 g/10 min to 4 g/10 min, at 230° C. and under a load of 21.19N (DIN 53,735).

The base layer comprising the propylene polymer may further contain conventional additives, for example, antistatic agents, lubricants and stabilizers.

The olefin resin composition of the sealable layer of the multilayer film is comprised of co- or terpolymers of ethylene, propylene, butylene or another alpha-olefin having up to 10 carbon atoms or of mixtures thereof. Its composition corresponds to the compositions usually employed for sealable layers. In general, an ethylene-/propylene copolymer having an ethylene content of from about 3 to 10% by weight is used, but ethylene-/butylene copolymers or mixtures of ethylene/butylene copolymers and ethylene/propylene/butylene terpolymers can likewise be used. The melting point of resins of this type is about 130° C. or higher, and their melt flow index varies between about 0.1 g/10 min and 16 g/10 min, at 230° C. and under a load of 21.19N (DIN 53,735).

The low-molecular weight resin used in the present invention, which is compatible with the olefin resin composition, comprises a natural or synthetic resin which has a softening point in the range from about 60° to 180° C. (determined according to DIN 1995-U4), preferably in the range from about 80° to 130° C. The low-molecular weight resins are, of course, non-olefinic resins.

Compatible resins are to be understood as including resins of a type which, when added to the olefin resin composition of the sealing layer in a concentration of up to about 15% by weight, do not cause any deterioration of the clarity of the film.

Examples of suitable low-molecular weight thermoplastic resins which are compatible with the olefin resin composition include hydrocarbon resins, ketone resins, polyamide resins, colophony, dammar resins, chlorinated aliphatic and aromatic hydrocarbon resins. These resins are described in "Ullmann, Encyklopaedie der technischen Chemie" (Ullmann's Encyclopedia of Industrial Chemistry), Volume 12, 1976, pages 525 to 555.

By "hydrocarbon resins" there are to be understood polymers which are substantially comprised of carbon and hydrogen and the constituents of which can be recovered, for example, from coke oven gas, from coal tar distillates, in cracking processes of naphtha and gas-oil and from turpentine oil. Important representatives of hydrocarbon resins which may be mentioned are the petroleum resins, the resins from coal tar and the turpentine resins. Typical examples of hydrocarbon resins are coumarone resins, mineral oil resins, and terpene resins. These resins are described at pages 539 to 546 of the above-mentioned volume of Ullmann.

Coumarone resins are usually obtained by polymerization of fractions of coal tar light oil, which have been freed from phenols and bases and which contain, for example, indene, styrene, dicyclopentadiene, coumarone and the homologs thereof as unsaturated components. By copolymerization with phenol and combination with other synthetic materials, coumarone resins can be modified in many ways. These resins are described at pages 545 to 546 of the above-mentioned volume of Ullmann.

The basic materials of mineral oil resins are obtained in the cracking of naphtha or gas-oil into raw materials for the chemical industry, for example, ethylene and propylene. Such basic materials are, for example, resin-forming compounds, such as butene, butadiene, pentene, piperylene, isoprene, cyclopentadiene, dicyclopentadiene, alkylbenzenes, methyl dicyclopentadiene, methyl indene, naphthalene, styrene, indene, vinyl toluene, methyl styrene. These resins are described at pages 541 to 542 of the above-mentioned volume of Ullmann.

Terpene resins are polymers of terpenes. Suitable terpenes are, for example, $\beta$-pinene, dipentene, limonene, myrcene, bornylene, camphene, and similar terpenes. Thes resins are described at pages 542 to 543 of the above-mentioned volume of Ullmann.

It is to be pointed out that the hydrocarbons are capable of being modified by reacting the raw materials prior to carrying out polymerization, by introducing special monomers, or by reacting the polymerized product. In this connection, special mention is made of hydrogenation or partial hydrogenation of unsaturated constituents of the resins. Possibilities of modifying hydrocarbon resins are described on pages 543 to 544 of the above-mentioned volume of Ullmann.

The term "colophony" covers natural resins which are obtained by distilling turpentine oil from a turpentine balsam recovered by tapping various species of pine (balsam resins), or which are obtained by solvent extraction of old root stalks (wood resins) or by fractional distillation of talloil (tall resins). Colophony is also meant to include colophony esters, as well as modified colophony (e.g., hydrogenated, dehydrogenated, fractionated, isomerized and disproportionated colophony) and similar substances. Colophony is described on pages 529 to 536 of the above-mentioned volume of Ullmann.

Condensation resins result from an acid-catalyzed condensation of mineral oil fractions with aldehydes. Typical representatives of such resins are xylene/formaldehyde resins and naphthalene/formaldehyde resins. Condensation resins are described at page 542, Volume 12, of Ullmann's Encyclopedia.

Dammar resins are obtained by tapping trees of the dipterocarpaicae family. These resins are described at page 527 of Ullmann's Encyclopedia, Volume 12, 1976.

The amount of the low-molecular weight resin which is compatible with the olefin resin composition should not fall below a lower limit of about 5% by weight, based on the weight of the sealable layer, since an effect of the resin addition on the optical properties and the sensitivity to scratching will only appear at higher resin properties. Additions in excess of about 15% by weight, based on the weight of the sealable layer, of low-molecular weight resin which is compatible with the olefin resin composition, have proved inappropriate for reasons of process engineering.

The polypropylene homopolymer which is used as component (c) of the sealing layer should have a melting temperature which is higher than the melting temperature of component (a). If less than about 5% by weight of the polypropylene homopolymer is added, there will only be slight improvements in optical properties and scratch resistance, and the runability in high-speed packaging machines will not be sufficiently improved. Additions in excess of about 15% by weight would further improve optical properties, scratch resistance and runability; however, in that instance, a marked deterioration of sealing characteristics would result.

According to the invention, it is possible to use polydiorganosiloxanes or mixtures thereof, which have a viscosity of at least about 100 mm$^2$/s at 25° C. Examples of suitable polydiorganosiloxanes are polydialkyl siloxanes, polyalkylphenyl siloxanes, olefin-modified siloxane oils, polyether-modified silicone oils, olefin/-polyether-modified silicone oils, epoxy-modified silicone oils and alcohol-modified silicone oils. Polydialkyl siloxanes preferably have from 1 to 4 carbon atoms in the alkyl group, and in particular, polydimethyl siloxanes are especially preferred.

In a particular embodiment of this invention, namely, when the polyolefinic multilayer film is to be imprinted, the surface of the sealable layer is subjected to a corona discharge treatment. In this case, component (d) is a polymethyl-phenyl siloxane which differs from the polydimethyl siloxane in that 30 to 70%, preferably 40 to 60%, of the methyl groups contained in the polydimethyl siloxane are replaced by phenyl groups. Polydimethyl siloxane has the disadvantageous property of undergoing cross-linking reactions under the action of the corona treatment, whereby the sealable layer loses its sealing properties. Polymethyl-phenyl siloxane does not react in this way, so that the sealing properties remain unaffected.

Polymethyl-phenyl siloxane has a kinematic viscosity of at least 100 mm$^2$/sec, at 25° C.

Component (d) of the sealable layer should comprise not less than about 0.3% by weight, based on the weight of the sealable layer, of polydiorganosiloxane, since in the combination of raw materials described, a lower proportion would lead to an increasing number of rejections in high-speed packaging machines. On the other hand, amounts of polydiorganosiloxane exceeding about 1.5% by weight, based on the weight of the sealable layer, would lead to technical difficulties in film production and also to defective wrappings obtained in packaging machines, as a result of insufficient friction.

It is possible to add conventional additives, for example, lubricants, antistatic agents and stabilizers to the sealable layer.

Aluminum silicates having the shape of platelets have been found to be suitable inorganic pigments. During the biaxial orientation of the film they are predominantly aligned in the direction of the film level and thus do not exert any abrasive effect.

Pigments having a mean diameter from 0.1 to 1.0 μm have proved particularly suitable.

Pigments in the shape of pellets or needles, such as for example, the SiO$_2$ or CaCO$_3$ types, are not suitable. They lead to an increased sensitivity to scratching, impairment of the optical properties and, if they have larger diameters, also to an impairment of the processing properties on high-speed packaging machines.

The corona treatment is performed by the customarily employed method, in which the film is passed between two conductor elements serving as electrodes, whereby the voltage, in general alternating voltage, applied to the electrodes is high enough to permit spray or corona discharges. By these spray or corona discharges, the air above the film surface is ionized and reacts with the molecules on the film surface, so that polar groups are obtained in the substantially nonpolar polymer matrix and, as a consequence thereof, the printability of the film is improved.

The thickness of the sealing layer(s) should be below about 3 μm, particularly below about 1 μm since the processing behavior in high-speed packaging machines would again deteriorate at greater layer thicknesses. The biaxially oriented multilayer film preferably has a thickness of from about 10 to 50 μm, particularly preferably from about 15 to 35 μm.

Unless specifically mentioned, the individual data were determined according to the following methods:
Melt flow index—DIN 53,735, at 230° C. and under a load of 21.19N,
Softening point—DIN 1995-U4,
Melting point—DCS measurement, peak of melting curve, rate of heating 20° C./min.

Haze

Haze of the film is measured according to ASTM-D 1003-52; however, a 1° slit diaphragm is used instead of a 4° aperture plate, and haze is indicated in percent for four superimposed film layers. Four layers were chosen since, in this way, the optimum measurement range is obtained.

Gloss

Gloss is measured by means of a type RGN 10.01.02 reflectometer, according to Dr. Schwarzau, Berlin, using a planar, polished black glass plate as the standard.

Scratch Resistance or Sensitivity to Scratching

Scratch resistance is determined according to DIN 53,754.

For determining the scratch resistance, an abrasion meter Taber Model 503 Abraser, manufacturer Teledyne Taber, is employed, using CALIBRADE H18 friction discs loaded with 250 g. Scratch resistance or sensitivity to scratching is to be understood as meaning the increase in haze of the scratched film as compared with the original film, after 50 revolutions of the turntable.

EXAMPLES

Employing the coextrusion process, multilayer films which had, in sum, a thickness of 1 mm, in each case, were extruded through a slot die having a width of 280 mm and a gap height of 1.8 mm, at an extrusion temperature of 260° C. and a throughput of 70 kg/h. The film had a base layer formed of polypropylene having a melt flow index of 2 g/10 min and two outer layers of various compositions.

After passing through a 20 mm long air gap, these films were chilled on a chill roll at 30° C., which had a diameter of 600 mm and rotated at a circumferential speed of 4.5 m/min. From the chill roll, the films were then passed on to a tension isolation device consisting of three rolls, which also had a temperature of 30° C. and rotated at a circumferential speed of 4.5 m/min. The films were then heated to a temperature of 130° C. and longitudinally stretched by a factor of 5 by a further arrangement of three rolls. After stretching in the longitudinal direction, they were stretched 10-fold in the transverse direction, at an ambient temperature of 175° C. The multilayer films thus formed had a base layer of polypropylene having a thickness of about 19 μm and, on either side thereof, a sealing layer having a thickness of from about 0.5 to 0.8 μm.

In the table, the characteristics of the different multilayer films produced are compiled.

Comparative Example 1

The sealing layers were composed of:
(a) 79.3% by weight, relative to the weight of the sealing layer, of a random copolymer of ethylene and propylene having an ethylene content of 4.5% by weight, relative to the weight of the copolymer;
(b) 10% by weight, relative to the weight of the sealing layer, of ARKON P 125, which is a hydrogenated hydrocarbon resin having a softening point of 125° C.;
(c) 10% by weight, relative to the weight of the sealing layer, of a propylene polymer having a melting point of 162° C. (HOSTALEN PPN 1060 F1); and
(d) 0.7% by weight, relative to the weight of the sealing layer, of polydimethylsiloxane having a kinematic viscosity 30,000 mm²/s at 25° C.

Comparative Example 2

Comparative Example 1 was repeated, but additionally
(e) 0.5% by weight, relative to the weight of the sealing layer, of a SiO$_2$ pigment having the shape of pellets of a mean particle diameter of 1.0 μm, was added.

Example 1

Comparative Example 2 was repeated, but instead of the pellet-shaped SiO$_2$, 0.5% by weight, relative to the weight of the sealing layer, of an aluminum silicate having the shape of platelets of a mean particle diameter of 0.5 to 0.6 μm was added.

The superiority of the film of this invention, produced according to Example 1, is stated in Table 1.

It is true that the films prepared in accordance with Comparative Examples 1 and 2 exhibit good properties for individual features, but none of them combines all requirements, i.e., good optical properties, good scratch resistance, good runability on packaging machines and good converting properties without a tendency to telescope.

TABLE 1

| Example No. | Gloss (%) $\frac{S_1 + S_2}{2}$ | Haze (%) 4-fold | KE (%) $\frac{S_1 + S_2}{2}$ | Machine runability on packaging machine | Machine runability during converting and handling |
|---|---|---|---|---|---|
| Example | 169 | 21 | 25 | ++ | ++ |
| Comparative Example 1 | 170 | 19 | 24 | ++ | -- |
| Comparative Example 2 | 155 | 29 | 45 | +- | ++ |

S = Side
KE = Sensitivity to scratching
++ = very good
+ = good
+- = sufficient
- = poor
-- = insufficient

Example 2

A film was produced as described in Example 1, but instead of the polydimethyl siloxane used as component (d), the sealing layer contained 0.7% by weight, relative to the weight of the sealing layer, of a polymethylphenyl siloxane having a kinematic viscosity of 1,000 mm²/s at 25° C. One side of the film was then subjected to a corona treatment (primary voltage 200 V, current intensity 0.5 A).

Comparative Example 3

The film of Example 1 was subjected to a single-sided corona treatment as in Example 2.

Evaluation: Both films could be easily printed as can be seen from Table 2, the sealing properties of the film according to Comparative Example 3 are clearly inferior to those of the film according to Example 2.

TABLE 2

|  | Example 2 | Comparative Example 3 |
|---|---|---|
| Gloss (%) $\frac{S_1 + S_2}{2}$ | 165 | 169 |
| Haze (%) 4-fold | 22 | 21 |
| KE (%) $\frac{S_1 + S_2}{2}$ | 25 | 25 |
| Machine runability on packaging machine | ++ | ++ |
| Machine runability during converting and handling | ++ | ++ |
| Minimum sealing temperature (°C.) for a sealing strength of 0.5 N/15 mm of film width, corona-treated film surface | 124 | 150 |
| Minimum sealing temperature (°C.) for a sealing strength of 0.5 N/15 mm of film width, untreated film surface | 122 | 122 |

S = SideKE = Sensitivity to scratching
+' = very good

What is claimed is:
1. A sealable transparent multilayer film, comprising: a base layer comprised of a propylene polymer and at least one sealable layer comprised of a combination of:

(a) from about 67.5 to 89.6% by weight, relative to the weight of the sealable layer, of an olefin resin composition comprised of a co- or terpolymer of ethylene, propylene, butylene or another alpha-olefin having 5 to 10 carbon atoms or of a mixture of said polymers, (b) from about 5 to 15% by weight, relative to the weight of the sealable layer, of a low molecular weight resin which is compatible with the olefin resin composition, (c) from about 5 to 15% by weight, relative to the weight of the sealable layer, of a propylene homopolymer, (d) from about 0.3 to 1.5% by weight, relative to the weight of the sealable layer, of a polydiorganosiloxane, and (e) from about 0.1 to 1.0% by weight, relative to the weight of the sealable layer, of a silicate having the shape of platelets.

2. A multilayer film as claimed in claim 1, wherein component (b) of the sealable layer comprises a low molecular-weight resin selected from the group including hydrocarbon resins, ketone resins, polyamide resins, colophony resins, dammar resins, and chlorinated aliphatic and aromatic resins.

3. A multilayer films as claimed in claim 1, wherein component (d) of the sealable layer comprises a polydiorganosiloxane having a kinematic viscosity of at least about 100 mm$^2$/s at 25° C.

4. A multilayer film as claimed in claim 1, wherein component (e) has a mean particle diameter from about 0.1 to 3.0 μm.

5. A multilayer film as claimed in claim 4, wherein component (e) has a mean particle diameter from about 0.2 to 1.5 μm.

6. A multilayer film as claimed in claim 1, wherein component (d) of the sealable layer comprises a polymethyl-phenyl siloxane having a kinematic viscosity of at least about 100 mm$^2$/s at 25° C., and wherein the film has been subjected to a corona treatment to improve its printability.

7. A multilayer film as claimed in claim 1, wherein the multilayer film has been biaxially oriented and has a thickness of from about 10 to 50 μm.

8. A multilayer film as claimed in claim 7, wherein the film has a thickness of from about 15 to 35 μm.

9. A multilayer film as claimed in claim 1, wherein the thickness of the sealing layer is less than about 3 μm.

10. A multilayer film as claimed in claim 9, wherein the thickness of the sealing layer is less than about 1 μm.

11. A high-speed process for wrapping articles with a packaging film, comprising the steps of: feeding to a high-speed packaging machine a multilayer packaging film as defined by claim 1;

introducing an article to be wrapped into the machine; and packaging said article with said film at a high-speed in the machine.

12. A packaged article, comprising an article wrapped with a multilayer packaging film, wherein said film comprises the film defined by claim 1.

* * * * *